Figure 1:
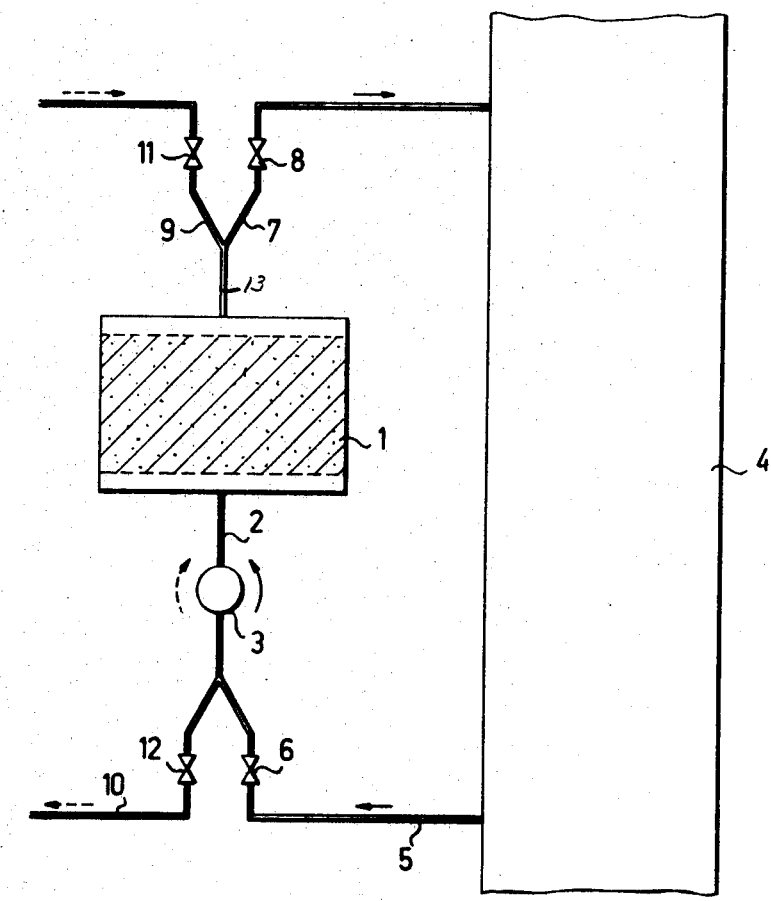

United States Patent [19]
Schmid

[11] 3,740,928
[45] June 26, 1973

[54] APPARATUS FOR ADSORBING CARBON DIOXIDE FROM AIR IN A STORAGE SYSTEM

[75] Inventor: Emmerich Schmid, Winterthur, Switzerland

[73] Assignee: Sulzer Brothers Ltd., Winterthur, Switzerland

[22] Filed: Apr. 20, 1972

[21] Appl. No.: 245,817

[30] Foreign Application Priority Data
May 25, 1971 Switzerland.................. 7597/71

[52] U.S. Cl................ 551/179, 55/68, 55/196, 55/387, 99/476, 99/646
[51] Int. Cl................................ B01d 53/04
[58] Field of Search............. 55/25, 26, 68, 74, 55/179, 196, 387; 99/476, 646

[56] References Cited
UNITED STATES PATENTS

| | | |
|---|---|---|
| 3,186,150 | 6/1965 | Zankey .................. 55/387 |
| 3,203,771 | 8/1965 | Brown et al. ............... 55/68 X |
| 3,313,631 | 4/1967 | Jensen .................... 99/475 |
| 3,323,288 | 6/1967 | Cheung et al............. 55/179 X |
| 3,594,986 | 7/1971 | Schmid .................... 55/68 |
| 3,621,585 | 11/1971 | Robertson............... 55/179 X |

Primary Examiner—Samih N. Zaharna
Assistant Examiner—Richard W. Burks
Attorney—Francis C. Hand, Hugh A. Chapin et al.

[57] ABSTRACT

The system for circulating the air from the storage room and for regenerating the active solid adsorbent in the adsorption chamber includes a reversible blower and a series of check valves. The check valves alternately close off the adsorption chamber either from the storage room or from a source of desorbent while opening the chamber to the source of desorbent or the storage room, respectively. The check valves are controlled by the pressure of the air in the storage room and the pressure of the desorbent.

3 Claims, 2 Drawing Figures

3,740,928

APPARATUS FOR ADSORBING CARBON DIOXIDE FROM AIR IN A STORAGE SYSTEM

This invention relates to an apparatus for adsobring carbon dioxide from air in a storage system, particularly, a storage system for fruit, vegatables, flowers, mushrooms and the like.

Heretofore, it has been known to store various perishable or oxidizable products, such as fruit, in a refrigerated condition in order to preserve the value of the products until delivery. Also, it has been known to obtain a further ripening of products such as green fruit in storage by heating. Further, in some instances, it has been known for unripe fruit or the like to be stored initially for a period of time in a refrigerated premise, and then to be given a further ripening by heating in the same premise shortly before delivery to users.

In all cases, the carbon dioxide content of the air present in the storage premises must be reduced to a particular percentage, and for further ripening processes, the carbon dioxide content must be considerably reduced still further. For instance, fruits or the like can be given "simple" storage satisfactorily for several months in refrigerated storage chambers if the atmosphere is supervised and adjusted appropriately and if the carbon dioxide ($CO_2$) content of the air in the storage premises is satisfactory.

As is known, the vital functions of fruit, such as apples or the like, continue after cropping, such that oxygen is constantly consumed while carbon dioxide ($CO_2$) is evolved. The fruit ages faster in proportion as these "respiratory events" with their consumption or sugar and other nutrients, proceed. Thus, it has become practicable to slow down the respiration or breathing rate of such products in order to increase storage life. One way of slowing down the respiration rate has been to considerably reduce the oxygen content of the atmosphere in the storage premises as compared with the oxygen content of ordinary air. For example, for the storage of fruit, the reduction is conveniently to something like 3 percent of the normal oxygen content.

One known process for providing an atmosphere differing from the composition of normal air in this way as regards oxygen and carbon dioxide ($CO_2$) content, in the case of fruit stored in refrigerated and externally gas-tight storage premises, has been to remove down to a required percentage the carbon dioxide which the stored fruit yields to the atmosphere in the premises in exchange for the oxygen which is taken up. That is, during respiration, the stored fruit or the like consumes more and more of the oxygen present in the air in the premises while producing more and more carbon dioxide. Once the desired minimum of about 3 percent oxygen content has been reached, this level can be maintained subsequently by a supply of atmospheric air. Even better, the oxygen content of the air in the storage premises can be artificially reduced to the required value.

Active carbon and zeolite have been known to make good solid adsorbents. However, the term "solid adsorbents" as used for the purposes of this invention is to be understood as covering cases in which a granular solid, such as gravel, forms the support for a liquid adsorbent, such as a potash solution.

Further, in adsorption apparatus for reducing solid regenerable adsorbents, it has been known to regenerate the solid adsorbent, once the adsorbent has become saturated e.g., active carbon saturated by carbon dioxide, by means of a desorption gas, preferably fresh atmospheric air.

Conventionally, in order to change over from "premises air" to fresh air and vice versa, use has been made of various change-over valves which are disposed in the supply and removal lines and which are operated by electric or hydraulic or pneumatic drives. Further, extra drive systems have been required to operate the change-over valves. As a result, reliable operation of an adsorption apparatus has been largely dependent upon the operating reliability and seal-tightness of the valves which also require fairly large torques for their operation. The known systems have therefore been unsatisfactory in construction and consume excessive power.

Accordingly, it is an object of this invention to provide an adsorption apparatus which is economic to operate and which uses simple change-over elements.

It is another object of the invention to effect a rapid change-over in the air supplied to a storage room for perishable products.

It is another object of the invention to eliminate the need for auxiliary drives and transmissions for changing over a valve from one state to another in an adsorption apparatus.

Briefly, the invention is directed to an adsorption apparatus for a storage room with an adsorption chamber, a pair of lines for conveying premises air from the storage room through the adsorption chamber and back to the storage room, a pair of lines for conveying a desorbent through the adsorption chamber, and a pair of lines, each of which is connected in common to each of one line for desorbent and one line for premises air and to the adsorption chamber. The invention provides this apparatus with a reversible blower in one of the common lines and a plurality of check valves in the respective lines for the premises air and the desorbent. The check valves are controlled by the pressure of the air in the storage room and by the pressure of the desorbent, respectively. That is, when the premises air is being circulated through the adsorption chamber during an adsorption period, the pressure of the air opens the check valves for the lines to the storage room while the check valves in the lines for the desorbent remain closed. At this time, the blower is operated to circulate the premises air through the adsorption chamber. Upon reversal of the blower for a regeneration period, the check valves for the lines to the storage room close and the check valves in the lines for the desorbent open.

In another embodiment, the adsorption apparatus has a pair of adsorption chambers which are operated in alternation so that while one undergoes an adsorption cycle, the other undergoes a regeneration cycle. In this case, a reversible blower is connected to each adsorption chamber within a line common to a premise air line and a desorbent line. Also, each premise air line and each desorbent line is in parallel with a main line to the respective storage room or desorbent supply.

The invention makes it possible to use automatic commercially available check valves made e.g. of a plastic such as polyvinyl chloride (PVC). Upon completion of an adsorption or regeneration period, the blower can be reversed, e.g. by changing over phases of the electricity supply to its motor.

Figure 2:
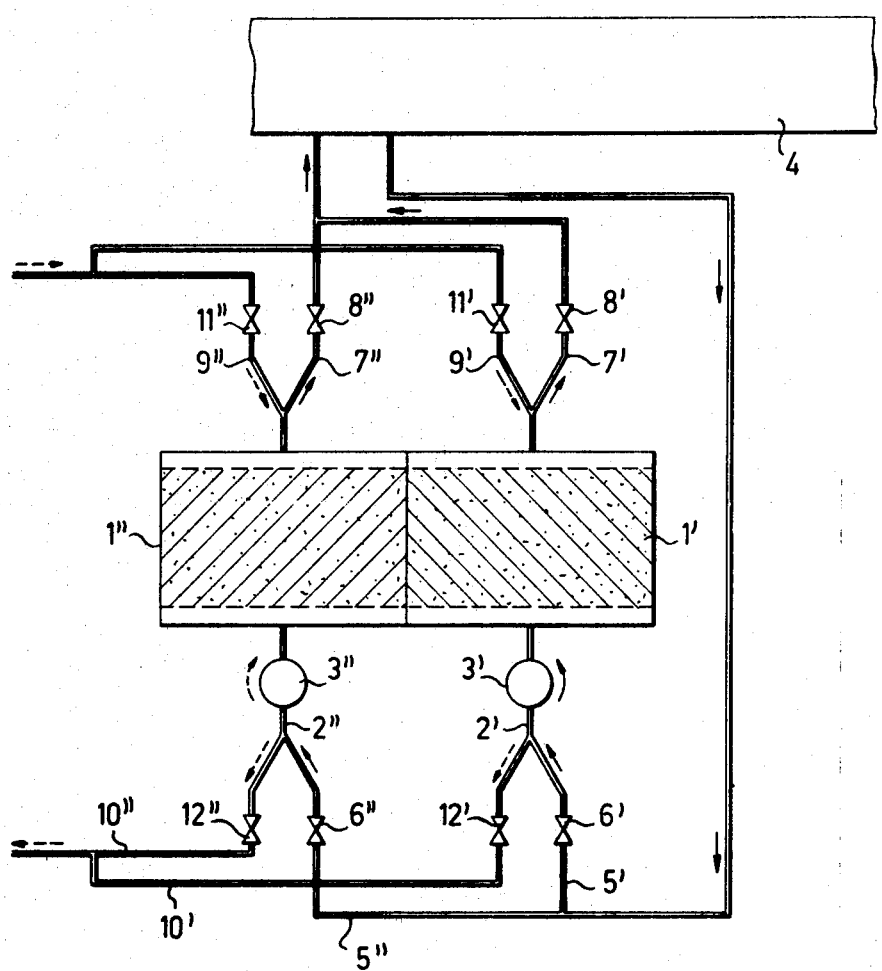

These and other objects and advantages of the invention will become more apparent from the following detailed description and appended claims taken in conjunction with the accompanying drawings in which:

FIG. 1 schematically illustrates an apparatus having one adsorption chamber according to the invention; and FIG. 2 schematically illustrates an apparatus having two adsorption chambers according to the invention in which at any time, and in alternate relationship, adsorption proceeds in one chamber and regeneration of the adsorbent in the other.

Referring to FIG. 1, an adsorption chamber 1 contains a charge of solid adsorbent such as active carbon grains. A line 2 is connected to the bottom of chamber 1 in which a reversible blower 3 is mounted in order either to circulate air from a storage room or premises 4 through the adsorption chamber 1 via an outlet line 5 and back to the premises 4 via a return line 7 or to convey fresh air as a desorbent through the adsorption chamber 1 via an input line 9 and an outlet line 10. The outlet line 5 from the storage premises 4 and the outlet line 10 for the desorbent are connected in common to the line 2 through the blower 3. Similarly, the return line 7 and the desorbent input line 9 are connected in common to each other through a line 13 on the opposite side of adsorption chamber 1 from the blower 3. In addition, a check valve 6 is positioned in the outlet line 5 and like check valves 8, 11, 12 are positioned in the respective lines 7, 9, 10.

During an adsorption period or phase, check valve 6 is open and blower 3, which can be a reciprocating compressor or a rotary compressor, is operative counter-clockwise and conveys air from premises 4 through line 5 and through chamber 1 with adsorption of carbon dioxide ($CO_2$). The air returns to premises 4 from chamber 1 through line 7 and open check valve 8. During this adsorption phase, check valves 11, 12 in lines 9, 10, respectively, are closed.

During a regeneration phase, the blower 3 is reversed, for example by means of a timer or manually, to operate clockwise and check valves 11, 12 are open to convey fresh air through the adsorption chamber 1 to regenerate the active carbon grains by removing the carbon dioxide as is known. At this time, the check valves 6, 8 in the lines 5, 7 to the storage premises 4 are closed.

The duration of adsorption and regeneration phase varies in each individual case.

Referring to FIG. 2, wherein like reference characters indicate like parts as above, the adsorption apparatus has two parallel-connected adsorption chambers 1', 1" which can either form one structural unit or can, of course, be fitted separately from one another. During operation, adsorption proceeds in the right-hand chamber 1' and adsorbent regeneration proceeds in the left-hand chamber 1". As shown, the outlet line from the storage premises 4 is divided into two parallel branch lines 5', 5" to connect over check valves 6', 6" to the lines 2', 2" to the respective adsorption chambers 1', 1". Similar parallel connections are made for the other main lines as shown. The direction in which the blower 3' rotates, and the direction of flow of the air in the storage premises, during the adsorption phase is indicated by solid arrows, and the direction in which blower 3" rotates and the direction of flow of the fresh air during regeneration is indicated by dotted arrows.

What is claimed is:

1. An apparatus for adsorbing carbon dioxide from air present in a storage room for perishable products comprising
   at least one adsorption chamber containing a solid adsorbent therein;
   a first line connected to said chamber;
   a reversible blower in said line;
   a first pair of lines for conveying air from the storage room through said blower, said line and said adsorption chamber and back to the storage room;
   a second pair of lines for conveying a desorbent through said adsorption chamber, said line and said blower to regenerate said solid adsorbent; and
   a plurality of check valves, each check valve being disposed in a respective one of said pairs of lines for alternately opening and closing said respective line in response to the pressure of air or desorbent respectively therein.

2. An apparatus as set forth in claim 1 wherein said line is connected in common to one of said first pair of lines and one of said second pair of lines.

3. An apparatus as set forth in claim 1 further comprising a pair of said adsorption chambers connected in parallel, a first said line connected to each chamber, a blower in each said line; pairs of branch lines connected in parallel between each line of said pairs of lines and said first lines respectively and check valves in each said branch lines whereby said chambers are operable in alternation with each other for adsorption and regeneration.

* * * * *